(12) United States Patent
Sibera et al.

(10) Patent No.: US 11,624,506 B2
(45) Date of Patent: Apr. 11, 2023

(54) SMART GLASS FOR A FIREPLACE

(71) Applicant: Wolf Steel Ltd., Barrie (CA)

(72) Inventors: Thisaru Sibera, Oshawa (CA); Cuong Vo, Barrie (CA); Jacob Wiltshire, Queensville (CA); Xiaoming Liu, Richmond Hill (CA)

(73) Assignee: Wolf Steel Ltd., Barrie (CA)

( * ) Notice: Subject to any disclaimer, the term of this patent is extended or adjusted under 35 U.S.C. 154(b) by 460 days.

(21) Appl. No.: 16/810,250

(22) Filed: Mar. 5, 2020

(65) Prior Publication Data

US 2020/0284435 A1    Sep. 10, 2020

Related U.S. Application Data

(60) Provisional application No. 62/815,856, filed on Mar. 8, 2019.

(51) Int. Cl.
| | |
|---|---|
| *F24B 1/18* | (2006.01) |
| *G02F 1/1333* | (2006.01) |
| *G02F 1/1334* | (2006.01) |
| *G02F 1/13* | (2006.01) |

(52) U.S. Cl.
CPC .......... *F24B 1/1808* (2013.01); *G02F 1/1334* (2013.01); *G02F 1/133382* (2013.01); *G02F 1/1313* (2013.01)

(58) Field of Classification Search
CPC ............. G02F 1/133382; G02F 1/1334; G02F 1/1313; F24B 1/1808
See application file for complete search history.

(56) References Cited

U.S. PATENT DOCUMENTS

| | | | |
|---|---|---|---|
| 2003/0201896 A1* | 10/2003 | Determan | G08B 17/00 340/584 |
| 2009/0241386 A1* | 10/2009 | Abileah | G02F 1/1336 40/428 |
| 2011/0283528 A1* | 11/2011 | Spinner | F24B 1/1957 29/726 |
| 2021/0242674 A1* | 8/2021 | Manz | B32B 17/10376 |

* cited by examiner

*Primary Examiner* — Edward J Glick
*Assistant Examiner* — David Y Chung
(74) *Attorney, Agent, or Firm* — Honigman LLP

(57) ABSTRACT

A fireplace with a smart glass panel and use of a smart glass panel in a fireplace are provided. The fireplace comprises a heating mechanism, and a smart glass panel positioned proximate to the heating mechanism. The smart glass panel comprising a transparent pane, where at least a portion of the smart glass panel has optic or thermal transmission properties that may be altered between a first state and a second state.

19 Claims, 18 Drawing Sheets

SMART GLASS FOR A FIREPLACE

FIELD

This invention relates to the field of appliances and fireplaces, and in one particular embodiment to gas and electric fireplaces.

BACKGROUND

Direct vent appliances, such as fireplaces, may be integrated into walls or panels of a building to provide light and/or heat into adjacent spaces, or they may simply serve as decoration as part of the structure. Modern fireplaces may be integrated into a building or structure in order to allow the internal content, combustion activity or flame to be viewed from one direction or multiple directions.

For example, two-sided or "double sided" fireplaces may be viewed from two adjacent rooms and may be used to heat and light those two rooms. In order to provide light to both rooms, these "double sided" fireplaces are also typically transparent or see-through, such that a user may look into the next room through the fireplace.

However, in certain situations such as when privacy is desired, this transparency may not be beneficial at all times. As well, the desired level of heat emitted from the fireplace into one room may be different from the desired level of heat that is emitted into the other adjacent room.

SUMMARY

There is provided a fireplace into which one or more smart glass panels are incorporated. The present smart glass may be in a state of opaqueness or in a state of transparency when subjected to a stimulus. Differing levels of opaqueness or transparency may be achieved by varying the voltage or current level that flows through its conductive material.

The smart glass panel may be installed or positioned on one or both sides of the fireplace. For electric fireplaces, the smart glass panel may be incorporated so as to replace the projection panel. The projected flame image or effect may thus be projected onto the smart glass panel. For gas fireplaces, the smart glass panel may be placed around the firebox or incorporated into a heat control system that is placed around the firebox.

In one embodiment, there is provided a fireplace comprising: a heating mechanism; and a smart glass panel positioned proximate to the heating mechanism, the smart glass panel comprising a transparent pane, where at least a portion of the smart glass panel has optic or thermal transmission properties that may be altered between a first state and a second state.

In another embodiment, there is provided a use of a smart glass panel in a fireplace with a heating mechanism, the smart glass panel positioned proximate to the heating mechanism, the smart glass panel comprising a transparent pane, where at least a portion of the smart glass panel has optic or thermal transmission properties that may be altered between a first state and a second state.

BRIEF DESCRIPTION OF THE DRAWINGS

For a better understanding of the present invention, and to show more clearly how it may be carried into effect, reference will now be made, by way of example, to the accompanying drawings which show exemplary embodiments of the present invention in which:

FIG. 3b is a back view of the smart glass panel of FIG. 3a.

FIG. 5 is a side view of the smart glass panel of FIG. 1a.

FIG. 6 is an enlarged exploded side view of the smart glass panel of FIG. 1a.

FIG. 8 is an enlarged side perspective view of a microscopic portion of the smart glass of FIG. 1a.

DESCRIPTION

The present invention may be embodied in a number of different forms. The specification and drawings that follow describe and disclose some of the specific forms of the invention.

The present application provides for the use of smart glass in a direct vent appliance, such as a fireplace.

Figure 3A:
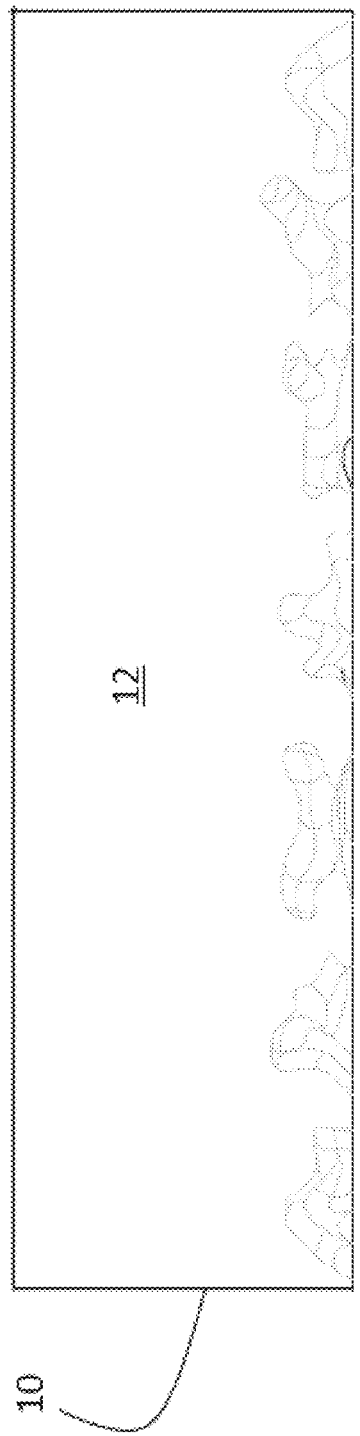
FIG. 3a is a front view of a smart glass panel according to another example embodiment in a first opaque state.
Figure 3B:
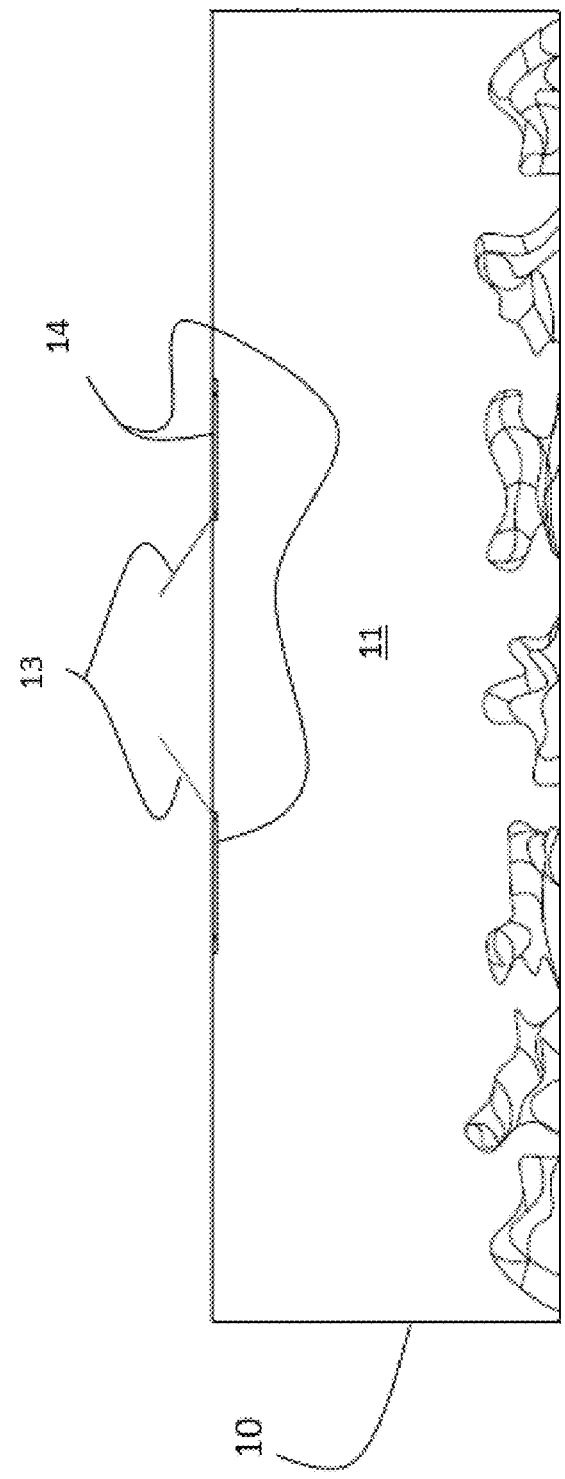
Figure 3C:
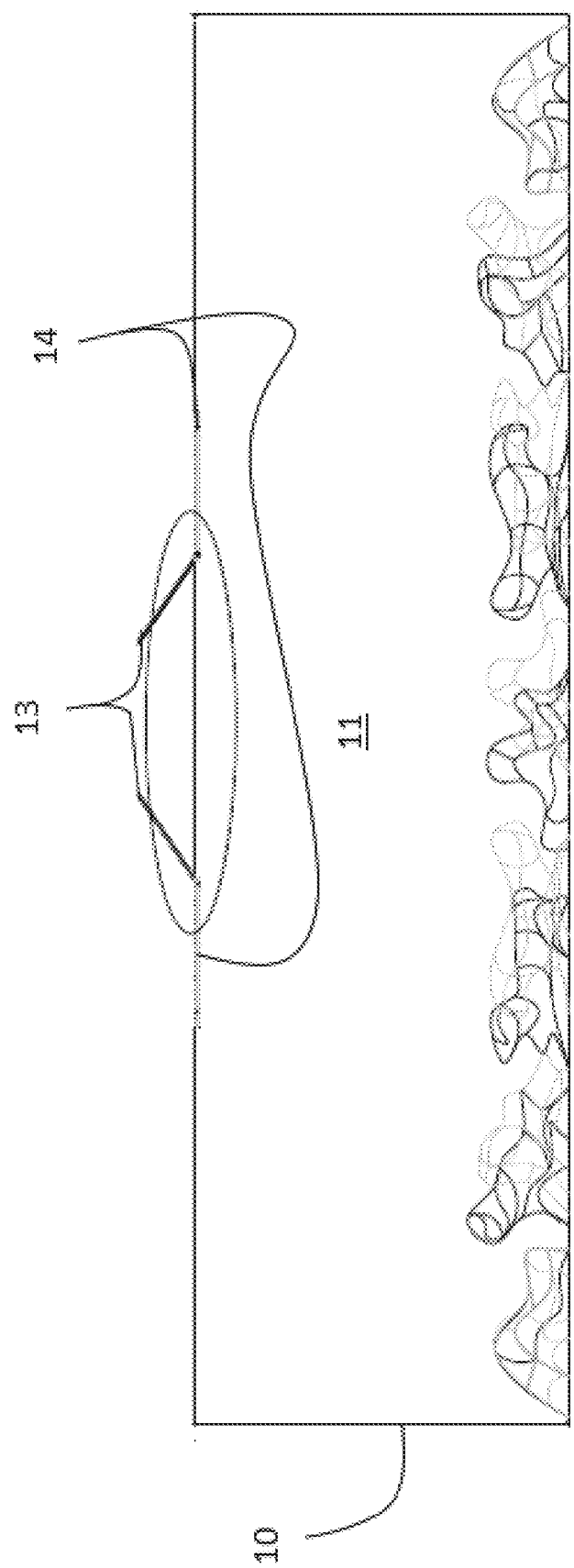
FIG. 3c is a back view of the smart glass panel of FIG. 3a in a second transparent state.
Figure 4:
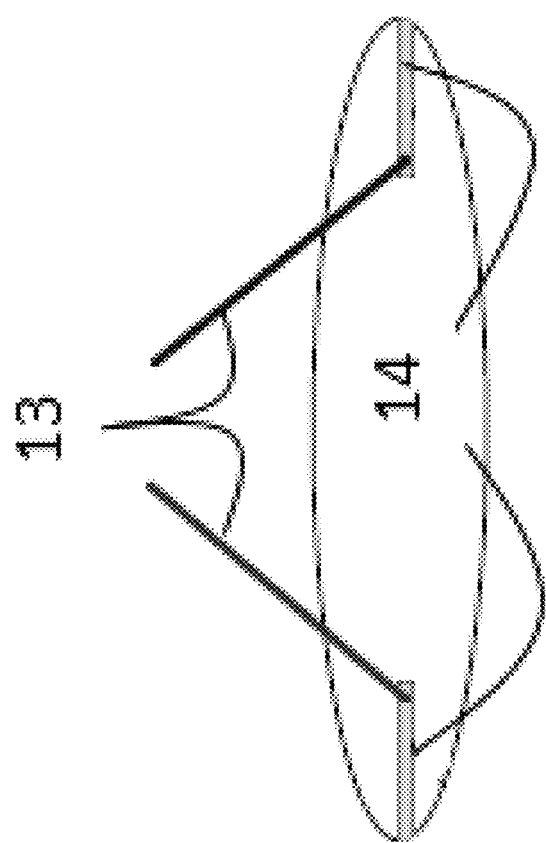
FIG. 4 is a schematic view of a second example conductive busbar that may be connected to the smart glass panel of FIG. 3a to allow an electric field to enter the smart glass panel.

Smart glass 10 is generally known in the art and is a glass or film applied to a glass whose optic and/or thermal transmission properties may be altered. See FIGS. 1a-5 for example. Smart glass technology may involve any type of technology that creates a visual effect within the glass itself in response to stimuli, hence, the term "smart". For example, the present smart glass may be in a default state of opaqueness (see FIGS. 1a, 3a, and 3b) and in a state of transparency (FIGS. 1b, 1c, and 3c) when subjected to a stimulus. However, smart glass technology is not limited to this application alone.

Figure 6:
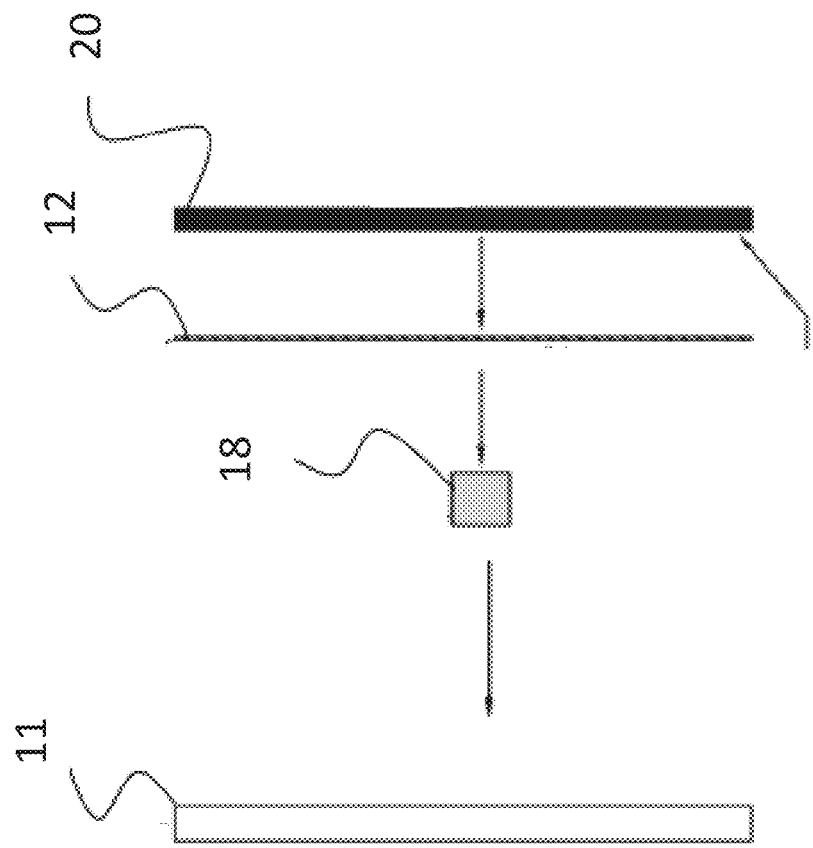
Figure 5:
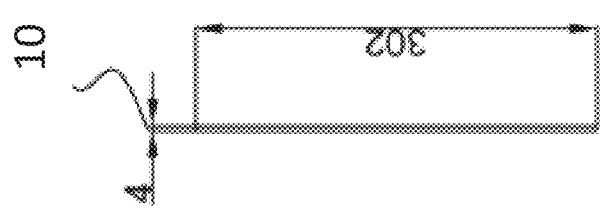
Figure 8:
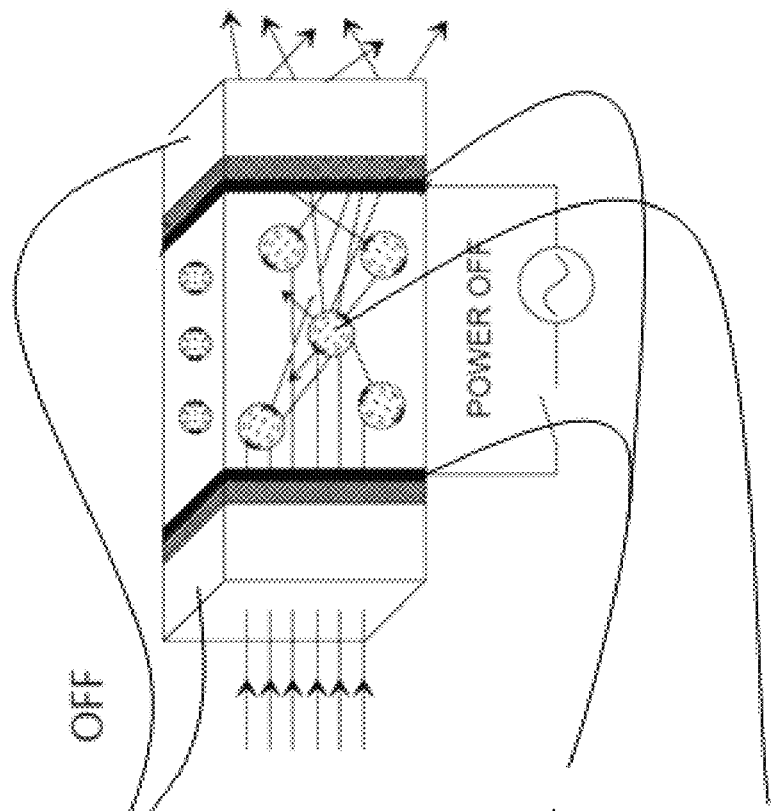
Figure 7:
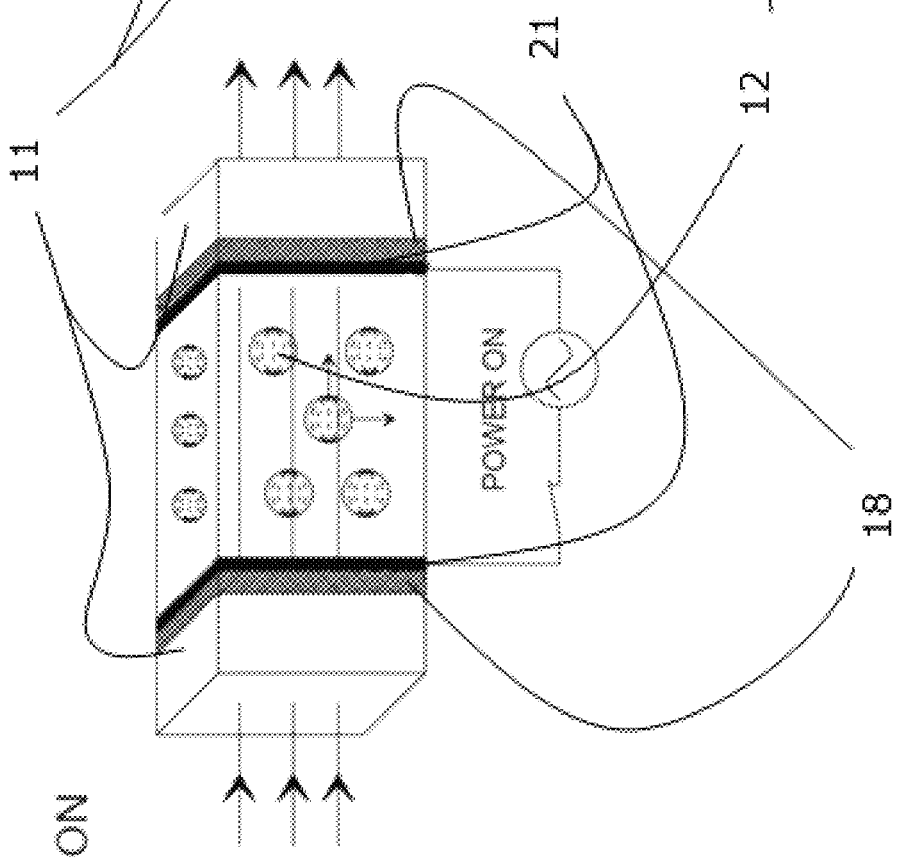
FIG. 7 is an enlarged side perspective view of a microscopic portion of the smart glass of FIG. 1b.

In the depicted embodiment, best seen in FIGS. 6-8, smart glass panel 10 is formed from a transparent or glass pane 11 and a Polymer Dispersed Liquid Crystal (PDLC) film 12 that reacts to an alternating electric modulation. PDLC material typically involves liquid crystals distributed in a liquid polymer. The mixture of liquid polymer and liquid crystals may be placed between layers of glass or plastic which include a layer of conductive material 21. The liquid polymer in this "sandwich" is then cured, thereby forming the basic structure of the smart glass. In an alternate application, the mixture of liquid polymer and liquid crystals may be secured to and converging a single layer of glass or plastic, which would also include a layer of conductive material 21.

Conductive material 21 is typically an electrically conductive, transparent substrate, such as indium Tin Oxide-coated PET film (polyethylene terephthalate) that is secured to and covering PDLC film 12. The resulting PDLC film 12 includes wiring (not shown) attached to a conductive copper strip called a busbar 14 along the film's edge 16. Rather than a copper strip, busbar 14 may be formed from any known conductive material useful for such applications known in the art, including silver pulp. All of these components may be taped down using a high temperature silk screen glue 18 or tape and covered with a silk screen frame 20.

Figure 1A:
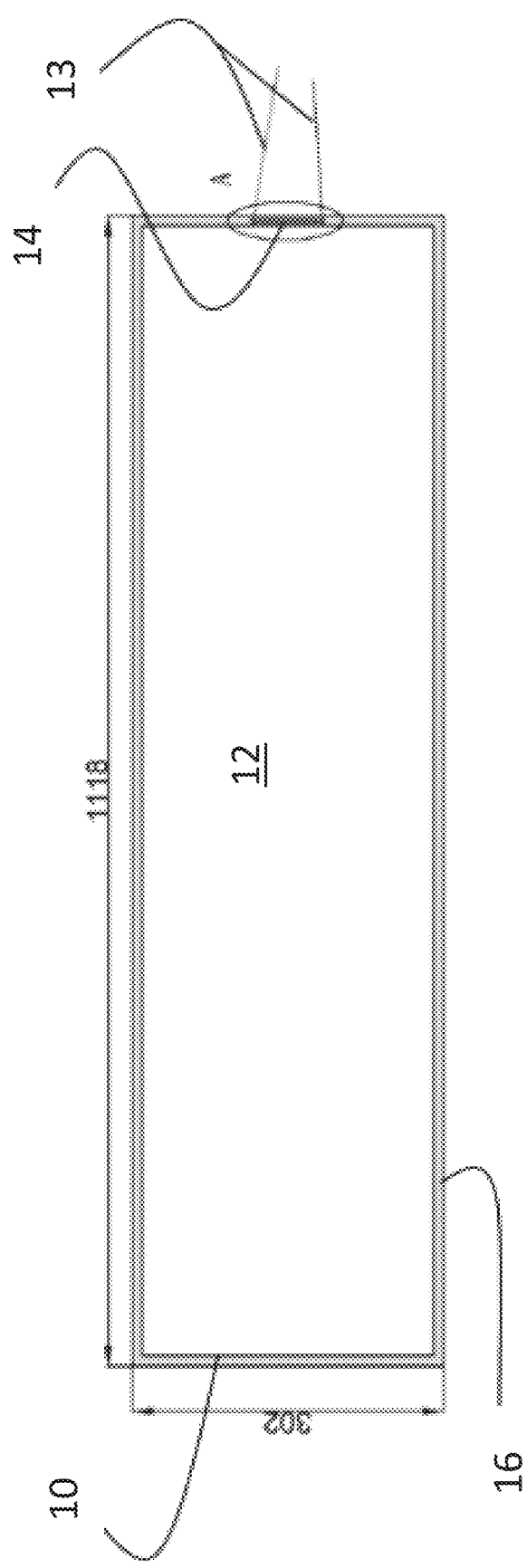
FIG. 1a is a front view of a smart glass panel according to an example embodiment in a first opaque state.
Figure 1B:
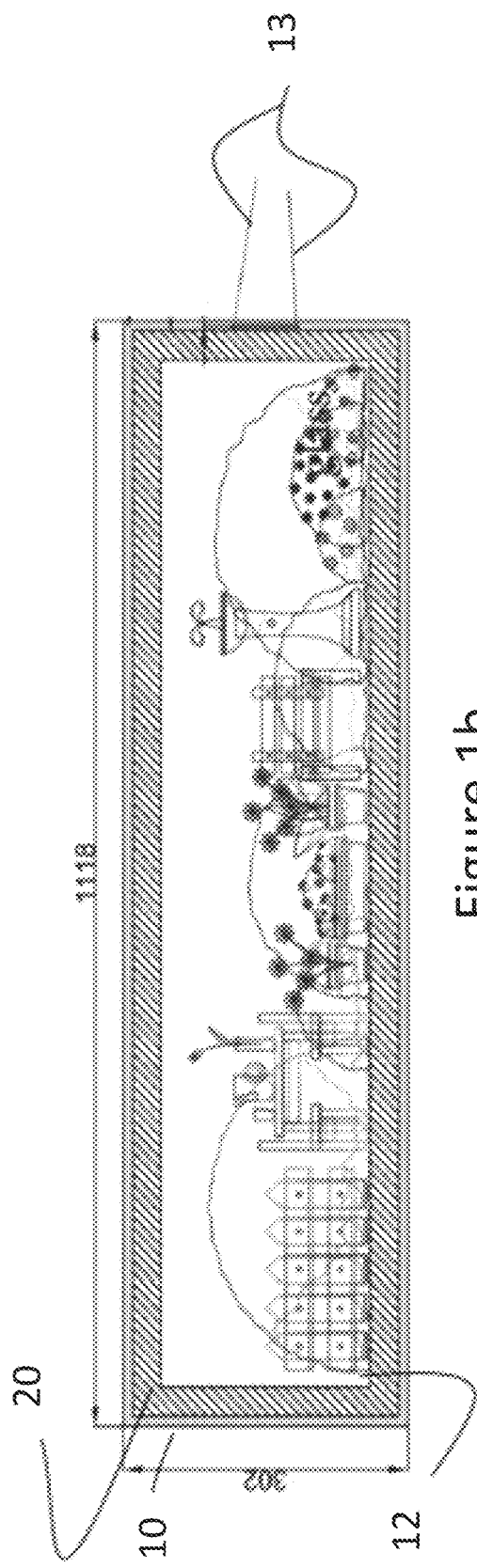
FIG. 1b is a front view of the smart glass panel of FIG. 1a in a second transparent state.
Figure 1C:
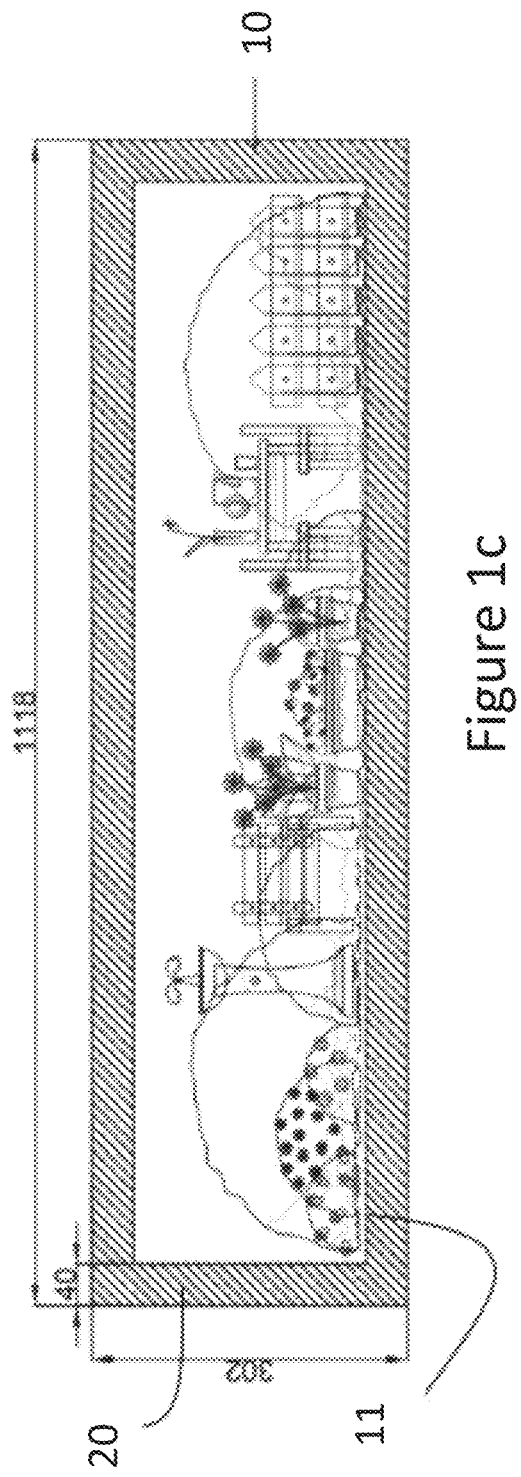
FIG. 1c is a back view of the smart glass panel of FIG. 1b in the second transparent state.
Figure 2:
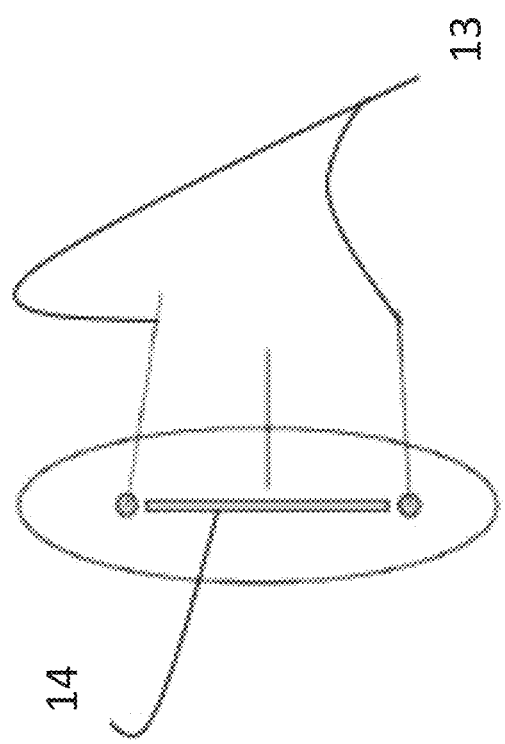
FIG. 2 is a schematic view of a first example conductive busbar that may be connected to the smart glass panel of FIG. 1a to allow an electric field to enter the smart glass panel.

When no current or voltage is applied to electrodes 13 of busbar 14, the liquid crystals in PDLC film 12 are orientated randomly within the polymer matrix, see FIG. 8 for example. This scatters light as it passes through the smart glass since the refractive index of the two substances (the liquid crystal and polymer) do not match. In this manner, smart glass panel 10 has a generally opaque or translucent appearance, i.e. the default first state of smart glass panel 10, as shown in FIG. 1a.

When a current is applied to electrodes 13 of busbar 14, the electric field directed through smart glass panel 10 via the conductive layer causes the liquid crystals to align, such that the liquid crystal's refractive index matches that of the polymer, see FIG. 7 for example. This causes alignment of the molecules and allows light to pass through with little scattering, resulting in a transparent state, i.e. the state of smart glass panel 10 shown in FIGS. 1b and 1c.

While a default opaque first state and a transparent second state in response to no voltage and with voltage, respectively, are described, smart glass panel 10 may alternately be configured to respond in the opposite manner. In other words, when no current or voltage is applied to electrodes 13 of busbar 14, smart glass panel 10 may be in the transparent state. When a current is applied to electrodes 13 of busbar 14, the electric field directed through smart glass panel 10 via the conductive layer may cause smart glass panel 10 to be opaque. For example, in other smart glass technologies, the particles may be given a net positive or net negative charge to produce the transparent or opaque states.

While only two states are shown in the Figures, the skilled person would understand that differing levels of opaqueness or transparency may be achieved by varying the voltage or current level that flows through the conductive material. For example, if a weak electric field is applied, a smaller portion of the liquid crystals align in the electric field to match that of the polymer, so a correspondingly small portion of light passes through while most of the light is scattered. This tends to result in smart glass panel 10 being in a translucent, but mostly opaque state. As the voltage applied increases, the electric field strength also increases, bringing a greater portion of the liquid crystals into alignment with the electric field and the polymer, thus allowing a larger portion of light to pass through.

As well, while PDLC film 12 are shown in the Figures, smart glass panel 10 may instead be comprised of different smart glass technology, such as electrochromic material, or suspended particle devices which react to an alternating electric modulation from busbar 14.

Smart glass panel 10 is shown to be generally uniform in terms of composition, such that either the entire glass is transparent or opaque depending on the electric current. However, in an alternate embodiment, smart glass panel 10 may comprise portions that include PDLC film 12, or related smart glass technology, and remaining portions that only include the glass and do not include PDLC film 12. In this manner, the transparency in specific locations of the glass may be adjusted, while the transparency in alternate locations may not.

In another embodiment, smart glass panel 10 may have portions or zones which are secured to separate conductive substrates and/or separate busbars 14. These remaining portions may have another PDLC film secured to and covering the remaining portion of the transparent pane, with a separate conductive layer secured to and covering the other PDLC film. A separate busbar would be electrically coupled to the separate conductive layer for receiving a different electric current. In this manner, the level of transparency in different zones may be independently adjusted relative to one another.

Figure 9:
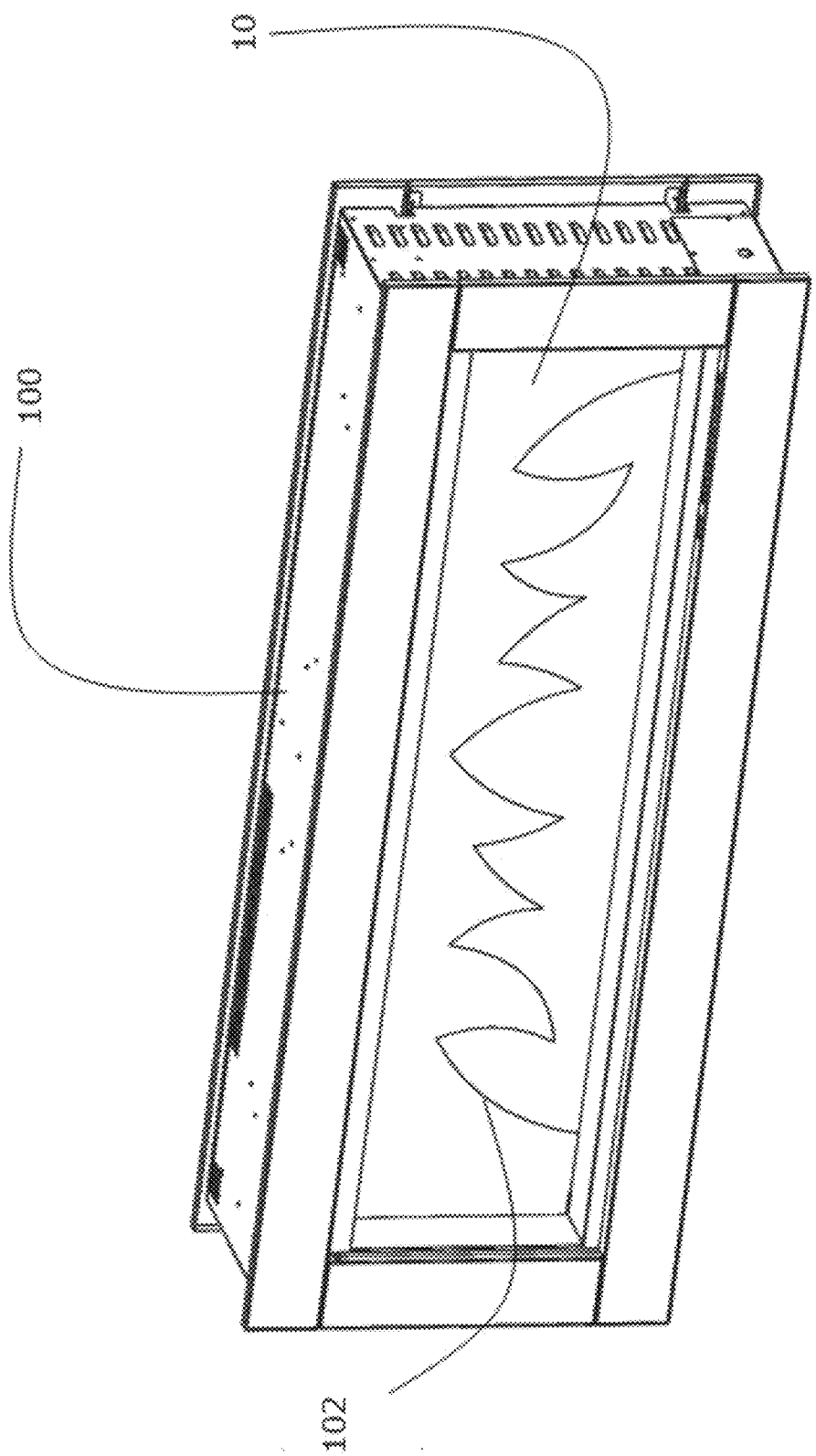
FIG. 9 is a front perspective view of a fireplace with the smart glass panel of FIG. 1a incorporated therein.
Figure 10:
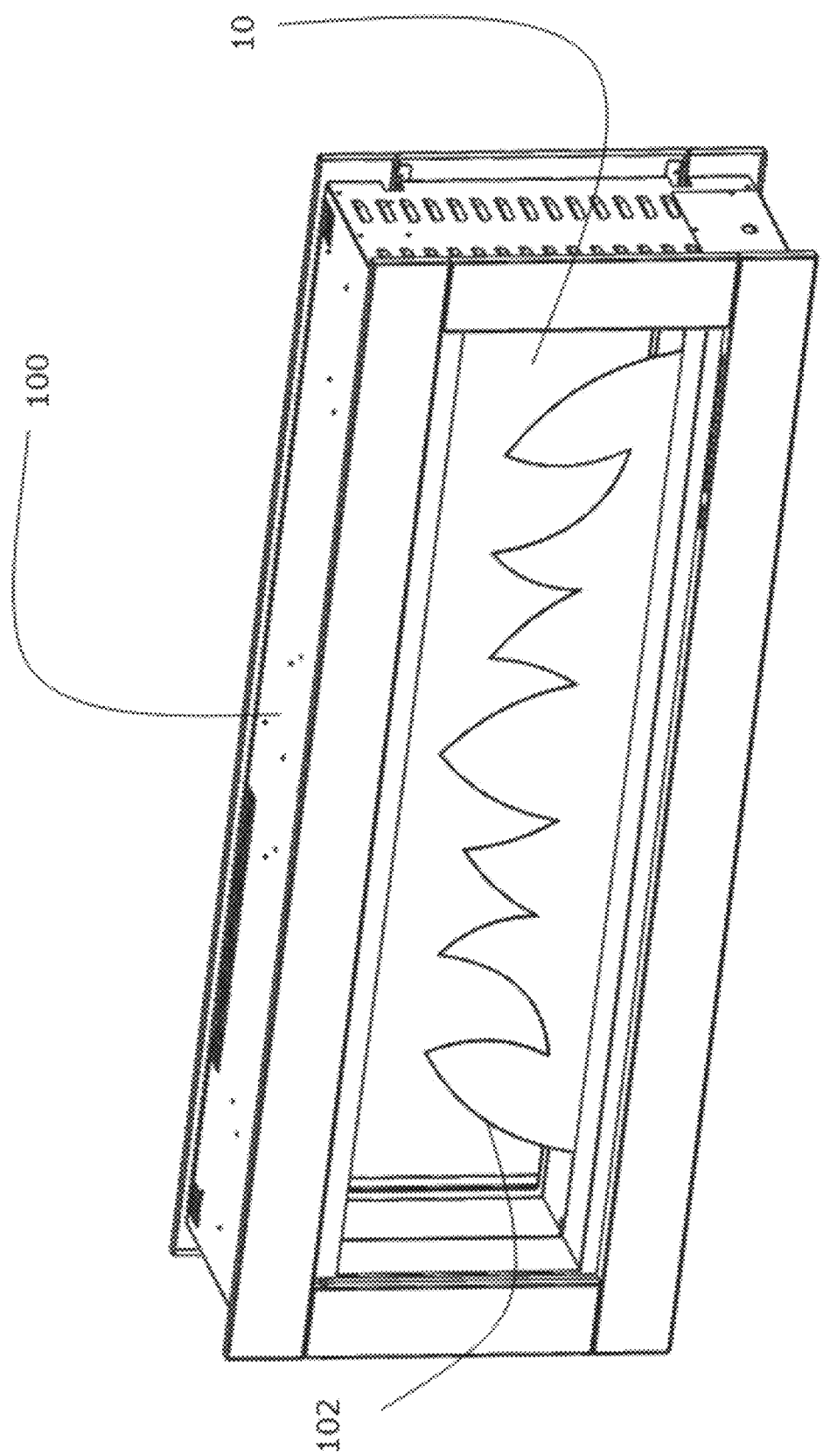
FIG. 10 is a front perspective view of the fireplace of FIG. 6 with the smart glass panel of FIG. 1b incorporated therein.

FIGS. 9 and 10 show an embodiment of smart glass panel 10 incorporated into a fully functioning fireplace 100. Fireplace 100 may be any type regardless of the heating source, including gas, wood and electric fireplaces.

For electric fireplaces, fireplace 100 may include a heating mechanism 200 and a flame effect mechanism 300.

Figure 11:
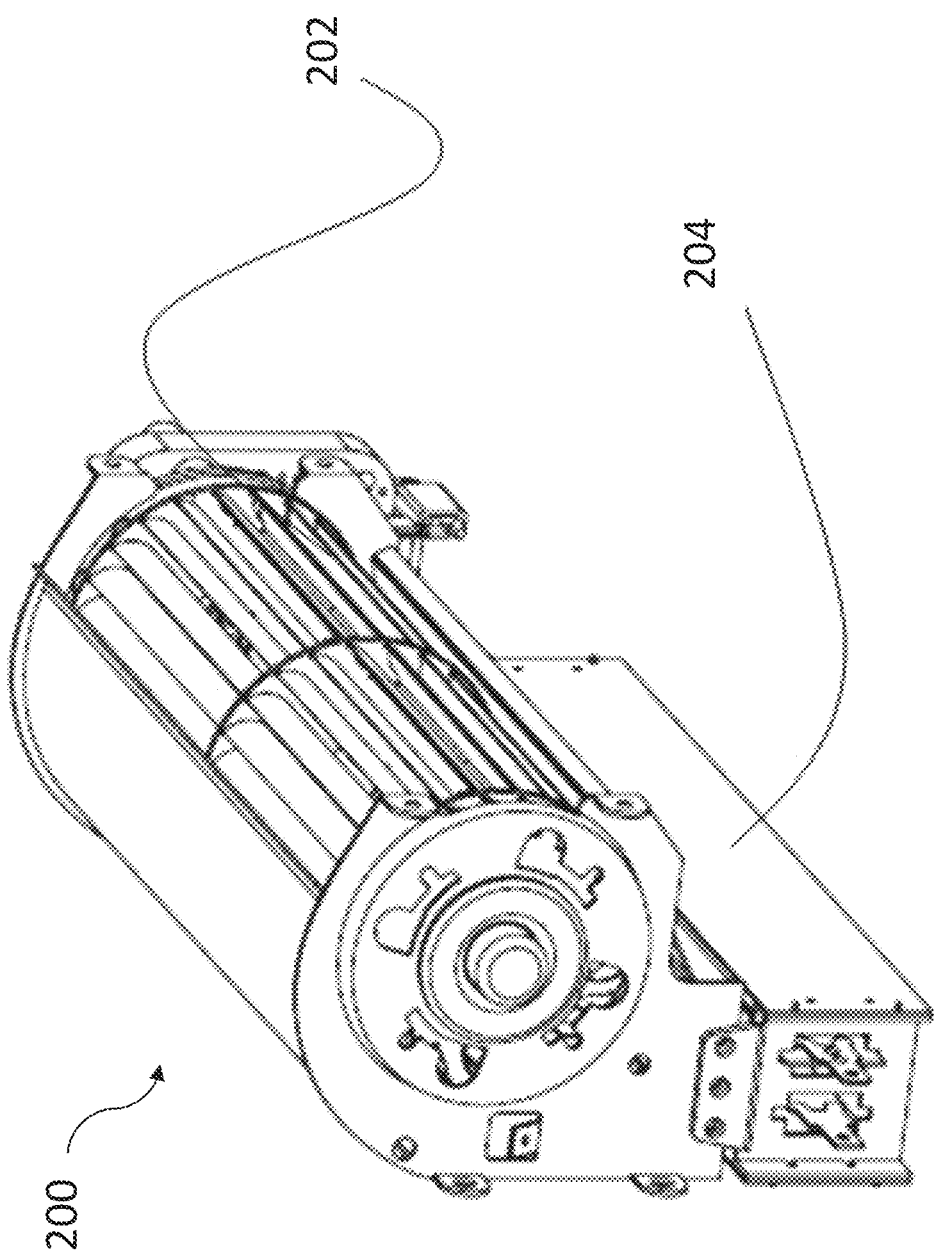
FIG. 11 is a perspective view of an example heating mechanism in isolation for use with the fireplace of FIG. 9.

Heating mechanism 200, as shown in FIG. 11 for example, may involve a blower or fan 202 at or near the top of the firebox that regulates air past a resistive element 204 that admits current past it. By doing so, the heat absorbed by the current is blown with the current out through ventilation compartments in the firebox. This is a typical heating element provided in most electrical fireplaces. Alternately, another potential heating element used could involve infrared radiation, to heat the environment in a room.

Figure 12:
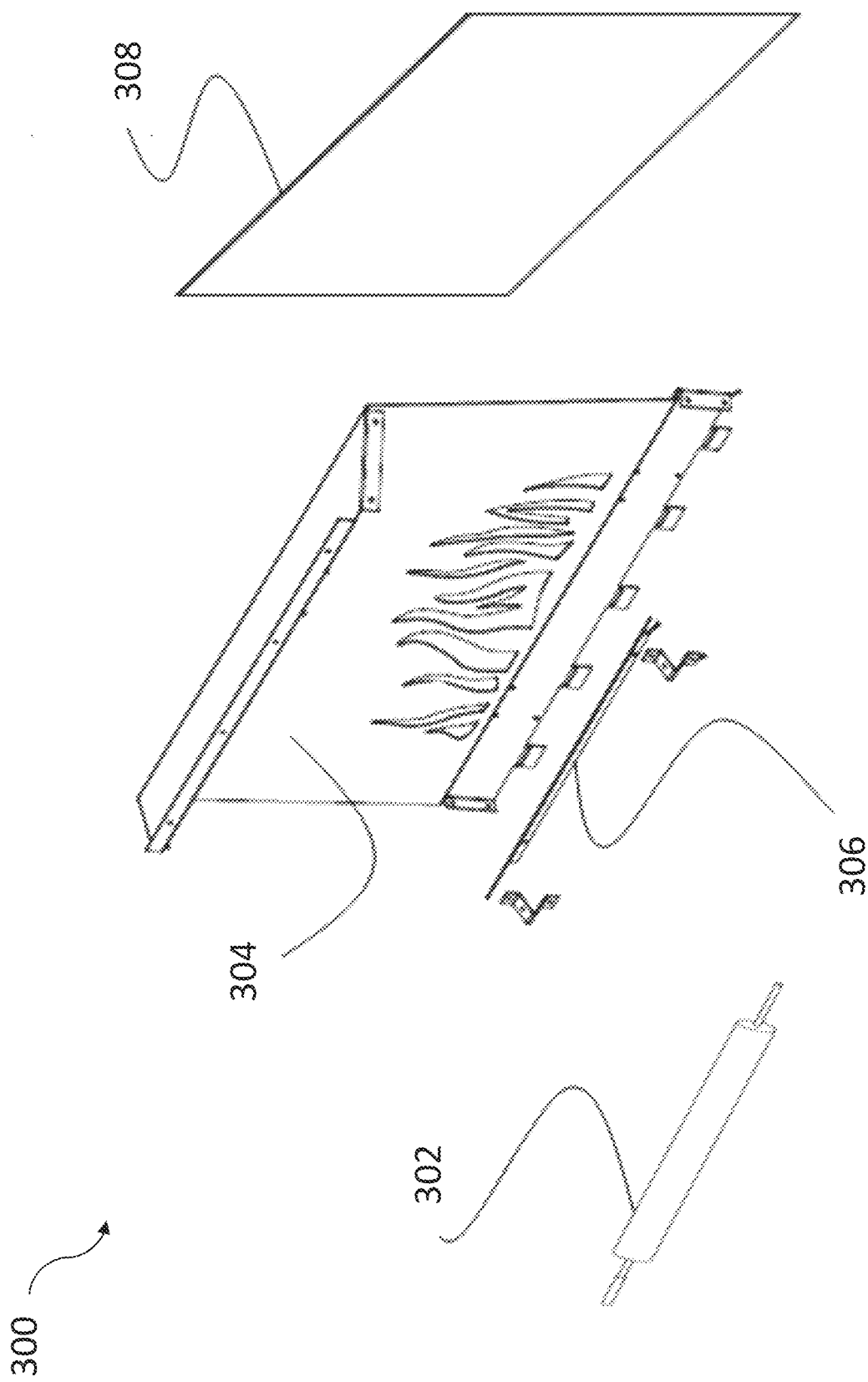
FIG. 12 is an exploded, perspective view of an example flame effect mechanism in isolation for use with the fireplace of FIG. 9.

Flame effect mechanism 300, as shown in FIG. 12 for example, may include a projection panel 308 to display a created flame effect, and a rotisserie/flicker element or rotating drum 302 to reflect light transmissions onto projection panel 308. There are a variety of known mechanisms by which a flame effect may be projected, including transmitting light through a flame cut-out pattern 304. Light may also, or instead, transmit light through a rotating reflector 306 onto projection panel 308 at an acute angle, thereby creating a flickering or burning flame effect on projection panel 308.

With electric fireplaces, smart glass panel 10 may be secured as an insert within fireplace 100 to replace the projection panel. In this manner, the flame effect may be projected and displayed on smart glass panel 10 itself.

The refraction gradient in smart glass panel 10 allows the LED projection to create a flame image on smart glass panel 10 similar to that on the typical projection panel. In this manner, the flame image may be projected onto smart glass panel 10 whether it is in its opaque or transparent state. The refraction gradient of smart glass panel 10, or the degree of transparency, may also be adjusted to enhance or vary the aesthetic appearance of the flame image on smart glass panel 10. Flame effect mechanism 102 may further be secured under or proximate smart glass panel 10 so the flame image may be viewed from both sides of smart glass panel 10.

In certain applications, control of the transparency of smart glass panel 10 may be coupled to flame effect mechanism 102 so the transparency of the glass and projected flame image may be coordinated together to create different visual effects. For example, in applications where smart glass panel 10 has three horizontal zones secured to separate conductive substrates and/or separate busbars 14, the transparency of the lower zone may be set to effectively reflect a small flame image from flame effect mechanism 102 and the upper two zones may be set to be fully transparent. The result is a robust image of a small simmering fire while the area above the glowing embers, which are not needed for image transmission, are fully transparent.

Figure 13:
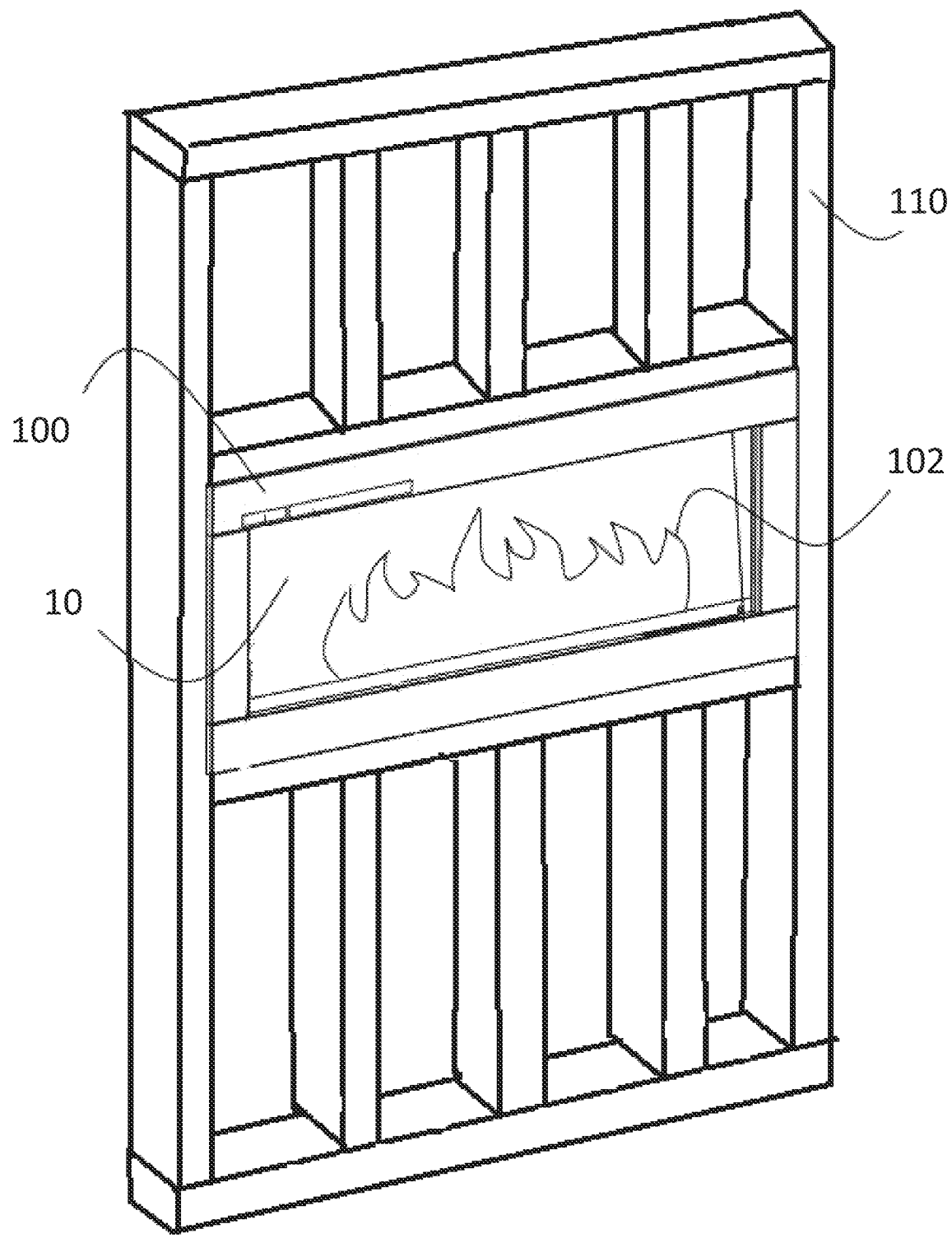
FIG. 13 is a front perspective view of a wall frame with the fireplace of FIG. 9 incorporated therein.

In a further application, rendering smart glass panel 10 opaque may also have a privacy screen effect. For example, if fireplace 100 were installed in a wall 110 between a washroom and bedroom (see FIG. 13 for example), smart glass panel 10 may be rendered opaque while the washroom is in use and privacy is desired. However, should the washroom not be in use, smart glass panel 10 may be rendered transparent.

Such an application would also be useful in cases where fireplace 100 is installed in an exterior wall of a building. Smart glass panel 10 may be rendered transparent when the user wishes for the flame effect to be visible from the outside. Smart glass panel 10 may then be rendered opaque when the user does not wish the internal areas of the building to be viewed from the outside.

Fireplace 100 may include one or more additional smart glass panels positioned and secured to one or more sides around fireplace 100. In this manner, the additional smart glass panels may be used for privacy purposes, while the central smart glass panel may be used for displaying the flame effect.

Figure 14:
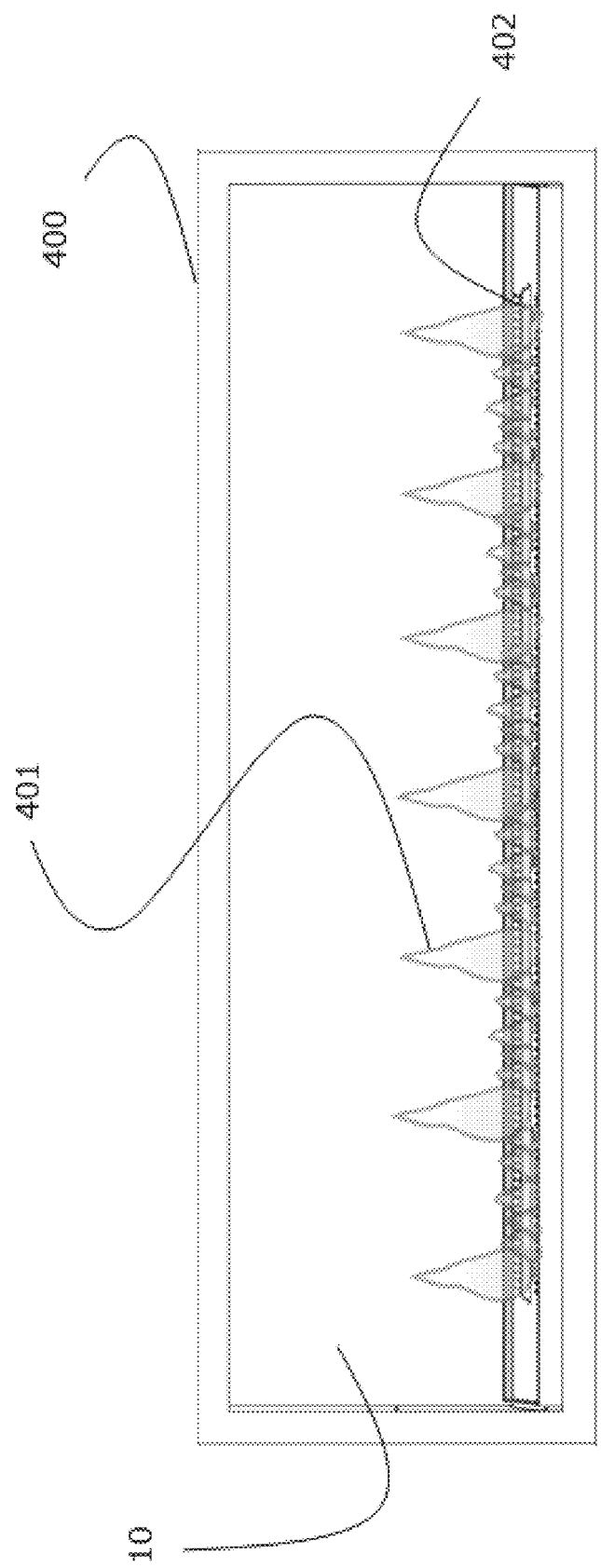
FIG. 14 is a front view of an example gas fireplace with the smart glass panel of FIG. 1b incorporated therein.

In another embodiment, fireplace 100 may be a gas fireplace 400, as shown in FIG. 14 for example, which includes a flame 401, a fire ignition mechanism 402, a gas valve system 405 and an air ventilation system 408.

Figure 15:
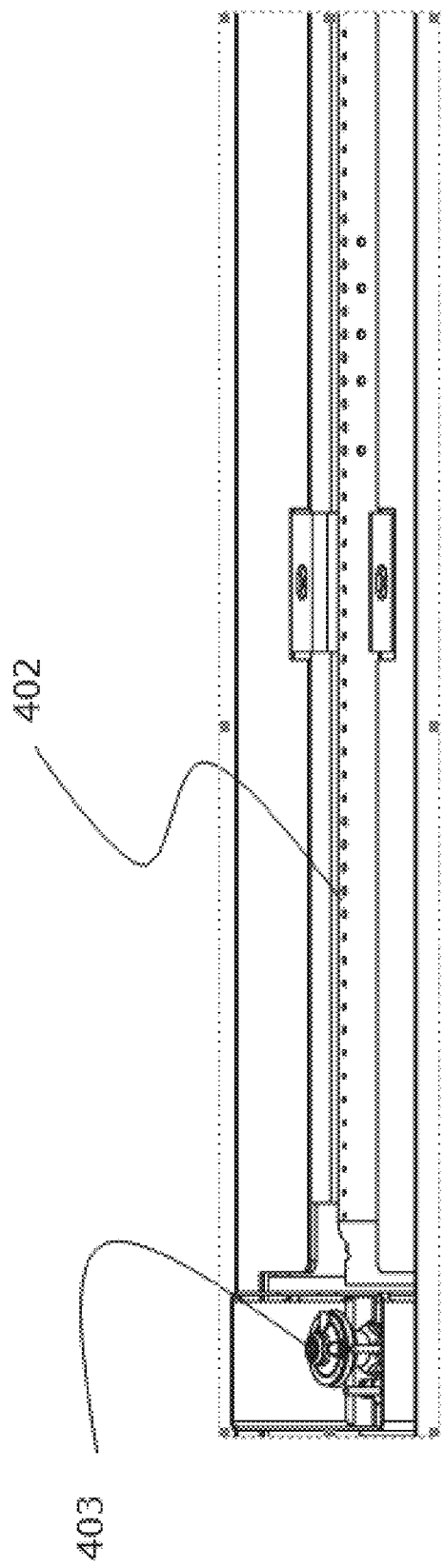
FIG. 15 is a top perspective view of an example burner mechanism in isolation for use with the fireplace of FIG. 9.
Figure 16:
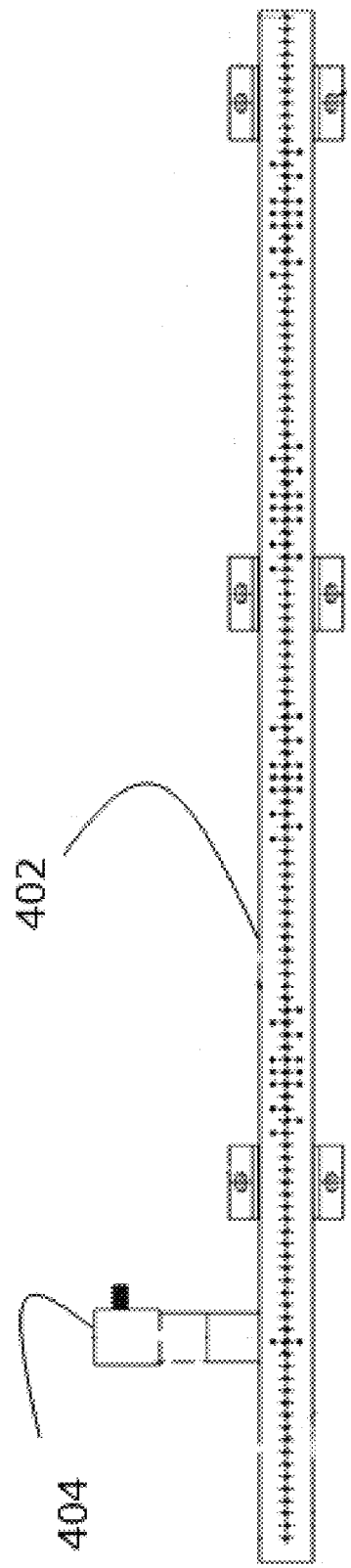
FIG. 16 is a front schematic view of the burner mechanism of FIG. 15.

Fire ignition mechanism 402, as shown in FIGS. 15 and 16 for example, typically includes a pilot light 403 that is a small gas burner kept continuously burning to light a larger burner when needed. It constantly radiates heat to a thermopile until a specific temperature is reached, activating the larger burner. This function of lighting the burner may be controlled.

Figure 17:
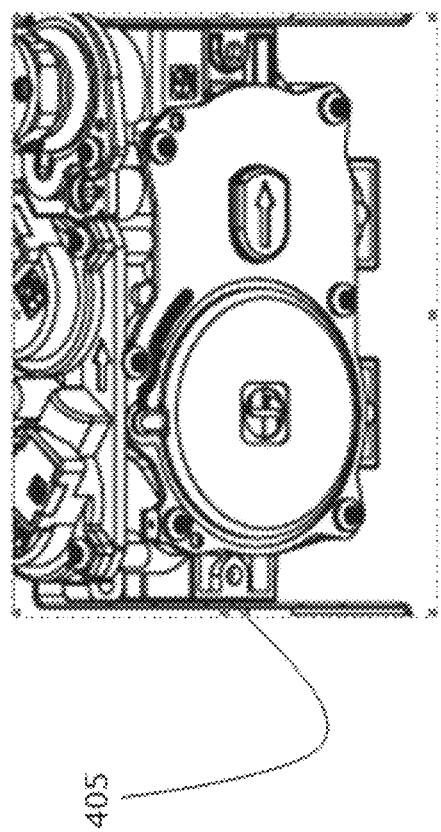
FIG. 17 is a perspective view of an example gas valve system in isolation for use with the fireplace of FIG. 9.

The gas is injected through a series of gas valves 404 (see FIGS. 16 and 17 for example) in gas valve system 405. The gas valve system may include piping and valves that inject gas from a gas supply as a source of fuel to be burned.

Figure 18:
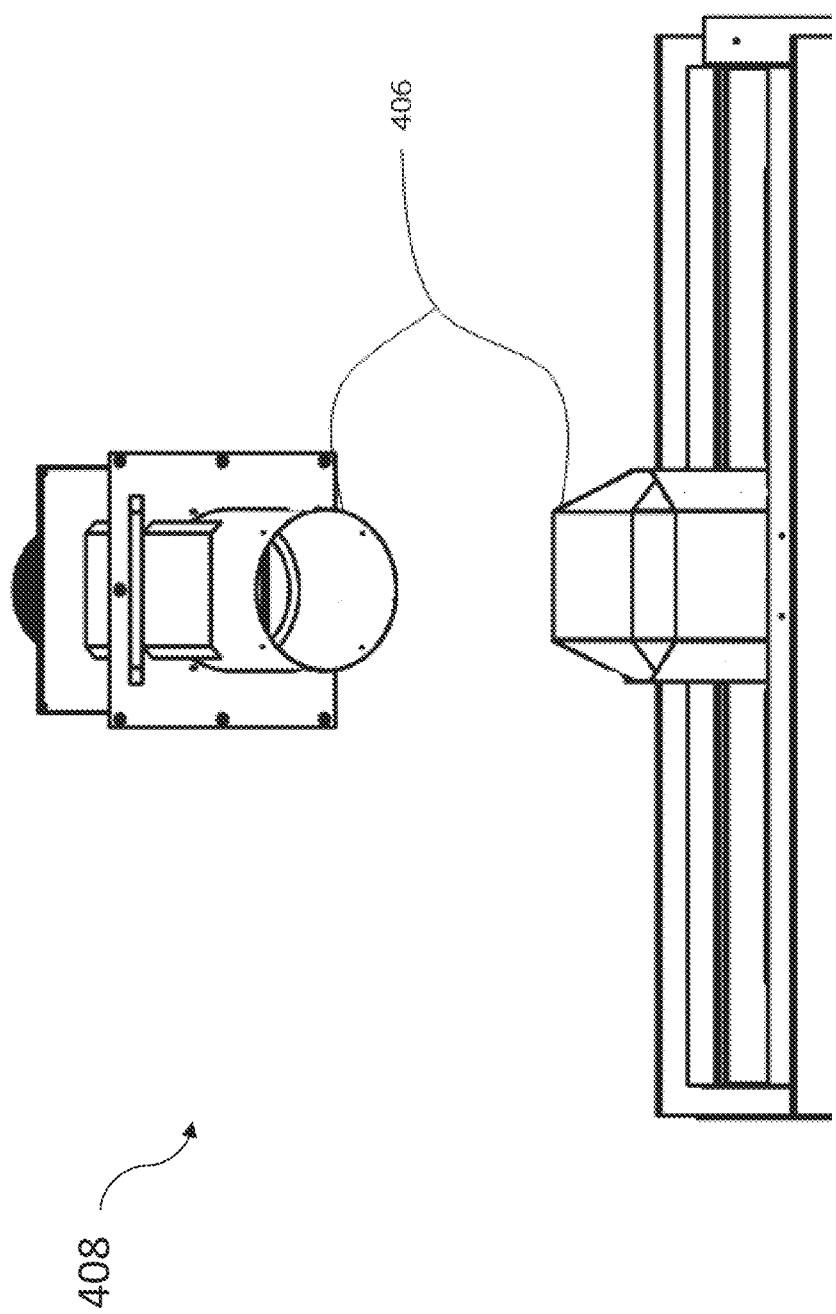
FIG. 18 is a perspective view of an example air ventilation system in isolation for use with the fireplace of FIG. 9.

Air ventilation system 408 (see FIG. 18 for example) may include rigid or flexible venting 406 that expels residual gas emissions from the combustion reaction and brings in cool air through the intake vent. This new air brought into fireplace 100 and allows the reaction to continue. The air ventilation system also radiates heat from the combustion out to the environment of fireplace 100 or gas fireplace 400.

In one embodiment of the present invention, smart glass panel 10 is secured to one or both sides surrounding the firebox of the gas fireplace. In such an application, the gas fireplace would typically also require a heat control system in order to maintain the temperature of smart glass panels 10 at or below an upper temperature limit at which smart glass panel 10 would break or otherwise malfunction. The heat control system may be a dynamic heat control system, such as the one discussed in U.S. application Ser. No. 15/903,958. In such a case, smart glass panels 10 may be integrated as part of the heat control system itself.

Smart glass panel 10 may also, or instead, be positioned at a distance relative to the firebox such that its temperature does not exceed its upper temperature limit.

As discussed above, rendering one or both smart glass panels 10 opaque may provide a privacy screen effect from the internal gas fireplace. As well, rendering one of the two smart glass panels 10 transparent, while leaving the other panel opaque also allows for the gas fireplace to be viewed from just one room and not the other.

It is understood that altering the state of the smart glass panel's light properties through electrical stimuli may also alter the smart glass panel's thermal properties. In the case when two smart glass panels are installed on both sides of the gas fireplace, one smart glass panel may be in a first, more thermally conductive state, while the second smart glass panel may be in a second, less thermally conductive state. The difference in thermal transitivity of the two panels may help to allow heat from the gas fireplace to be radiated or transmitted into one room more than the other, thereby allowing different temperatures to be achieved in the two rooms.

In another embodiment of the present invention, one or more smart glass panels may simply be installed or placed around existing known gas, electric or wood fireplaces. Smart glass panels 10 may then be used to create privacy between areas as discussed above, and may be used to isolate the view of the fireplace to a single room.

In yet another embodiment of the present invention, one or more smart glass panels 10 may be installed or placed around the electric fireplace described above, which also has smart glass panel 10 as its projection panel. As before, smart glass panels 10 may then be used to create privacy between areas as discussed above, and may be used to isolate the view of the fireplace to a single room.

The fireplaces described above may be constructed in a compact manner to allow it to be installed within a 2×8" wall.

It is to be understood that what has been described are the preferred embodiments of the invention. The scope of the claims should not be limited by the preferred embodiments set forth above, but should be given the broadest interpretation consistent with the description as a whole.

We claim:

1. A fireplace comprising:
   a heating mechanism; and
   a smart glass panel positioned proximate to the heating mechanism, the smart glass panel comprising a transparent pane,
   wherein at least a portion of the smart glass panel has optic or thermal transmission properties configured to be alternately set to one of a first state, a second state, and an intermediate state between the first state and the second state, wherein the first state is opaque, the second state is transparent, and the intermediate state is more transparent than the first state and more opaque than the second state,
   wherein the portion of the smart glass panel comprises
   a Polymer Dispersed Liquid Crystal (PDLC) film that reacts to alternating electric current, the PDLC film secured to and covering the portion of the transparent pane;
   a conductive layer secured to and covering the PDLC film; and
   a busbar electrically coupled to the conductive layer, the busbar configured to receive the electric current at varying levels.

2. The fireplace of claim 1, wherein a remaining portion of the smart glass panel includes only the transparent pane.

3. The fireplace of claim 1, wherein a remaining portion of the smart glass panel comprises:
   another PDLC film secured to and covering the remaining portion of the transparent pane;
   a separate conductive layer secured to and covering the other PDLC film; and
   a separate busbar electrically coupled to the separate conductive layer, the busbar for receiving a different electric current.

4. The fireplace of claim 1, wherein the fireplace is an electric fireplace comprising a flame effect mechanism.

5. The fireplace of claim 3, wherein the smart glass panel is positioned above or proximate the flame effect mechanism, the smart glass panel acting as a projection panel on which a created flame effect from the flame effect mechanism is displayed.

6. The fireplace of claim 4, wherein the smart glass panel is operatively coupled to the flame effect mechanism.

7. The fireplace of claim 4, further comprising an additional smart glass panel secured to a side of the fireplace.

8. The fireplace of claim 1, wherein the fireplace is a gas fireplace comprising a firebox.

9. The fireplace of claim 7, wherein the smart glass panel is secured to one side surrounding the firebox.

10. The fireplace of claim 8, further comprising a heat control system coupled to the heating mechanism, the heat control system configured to maintain the temperature of the smart glass panel at or below an upper temperature limit.

11. The fireplace of claim 8, wherein the smart glass panel is positioned at a distance from the firebox such that its temperature does not exceed an upper temperature limit.

12. The fireplace of claim 8, further comprising an additional smart glass panel secured to another side of the firebox.

13. Use of a smart glass panel in a fireplace with a heating mechanism, the smart glass panel positioned proximate to the heating mechanism, the smart glass panel comprising a transparent pane, where at least a portion of the smart glass panel has optic or thermal transmission properties configured to be alternately set to a first state, a second state, or an intermediate state between the first state and the second state,
   wherein the first state is opaque, the second state is transparent, and the intermediate state is more transparent than the first state and more opaque than the second state,
   wherein the smart glass panel comprises,
   a Polymer Dispersed Liquid Crystal (PDLC) film that reacts to alternating electric current, the PDLC film secured to and covering at least a portion of the transparent pane;
   a conductive layer secured to and covering the PDLC film; and
   a busbar electrically coupled to the conductive layer, the busbar configured to receive the electric current at varying levels.

14. The use of claim 13, wherein the first state is thermally conductive and the second state is less thermally conductive than the first state.

15. The use of claim 13, wherein the fireplace is an electric fireplace, the smart glass panel is positioned above or proximate a flame effect mechanism and used as a projection panel on which a created flame effect is displayed.

16. The use of claim 15, wherein the smart glass panel is operatively coupled to the flame effect mechanism, the use further comprising coordinating the transparency of smart glass panel and projected flame image to create different visual effects.

17. The use of claim 13, wherein the fireplace is a gas fireplace, the use further comprising use with a heat control system coupled to the heating mechanism, the heat control system configured to maintain the temperature of the smart glass panel at or below an upper temperature limit.

18. A fireplace comprising:
   a heating mechanism; and
   smart glass panel positioned proximate to the heating mechanism, the smart glass panel comprising:
      a transparent pane, where at least a portion of the smart glass panel has optic or thermal transmission properties configured to be alternately set to one of a first state, a second state, and an intermediate state between the first state and the second state;
      the portion of the smart glass panel comprising a Polymer Dispersed Liquid Crystal (PDLC) film, and a remaining portion of the smart glass panel comprising another PDLC film, both PDLC films configured to react to alternating electric current;
      two separate conductive layers, each secured to and covering one of the PDLC films; and
      two separate busbars, each electrically coupled to one the separate conductive layers, the busbars for receiving different electric currents.

19. A fireplace comprising:
   a heating mechanism; and
   a smart glass panel positioned proximate to the heating mechanism, the smart glass panel comprising a transparent pane, where at least a portion of the smart glass panel has optic or thermal transmission properties that may be altered between a first state and a second state,
   wherein the portion of the smart glass panel comprises (i) a Polymer Dispersed Liquid Crystal (PDLC) film that reacts to alternating electric current, the PDLC film secured to and covering the portion of the transparent pane; (ii) a conductive layer secured to and covering the PDLC film; and (iii) a busbar electrically coupled to the conductive layer, the busbar for receiving the electric current, wherein the first state is opaque and the second state is transparent, and,
   wherein a remaining portion of the smart glass panel comprises (ii) another PDLC film secured to and covering the remaining portion of the transparent pane; (ii) a separate conductive layer secured to and covering the other PDLC film; and (iii) a separate busbar electrically coupled to the separate conductive layer, the busbar for receiving a different electric current.

* * * * *